United States Patent Office 3,658,722
Patented Apr. 25, 1972

3,658,722
CATALYSTS FOR POLYMERIZATION AND
PROCESS FOR THEIR PREPARATION
Andre Delbouille and Jean-Louis Derroitte, Brussels,
Belgium, assignors to Solvay & Cie, Brussels, Belgium
No Drawing. Filed June 27, 1969, Ser. No. 837,367
Claims priority, application France, July 1, 1968,
157,471
Int. Cl. C08f 3/06
U.S. Cl. 252—429 C
16 Claims

ABSTRACT OF THE DISCLOSURE

Highly active catalysts for the polymerization of olefins result from the combination of an organometallic compound and a complex obtained by reacting a halogenating agent and a transition metal compound selected from the halides, oxyhalides, haloalkoxides, oxyalkoxides and alkoxides of the metals of Groups IV$b$, V$b$ and VI$b$ of the Periodic Table with a solid support comprised of an oxygenated compound of a bivalent metal which is substantially anhydrous and is substantially free of hydroxyl groups.

BACKGROUND OF THE INVENTION

This invention relates to new polymerization catalysts and a process of preparing the same. More particularly, the present invention concerns new solid catalysts which are suitable for the polymerization and the copolymerization of olefins and a process for the preparation of said catalysts.

In United States Pat. No. 3,400,110 dated Sept. 3, 1968 which is incorporated herein by reference a process is described for the polymerization and the copolymerization of olefins in the presence of a catalyst which has been obtained by activating with an organometallic compound the reaction product of a transition metal compound with a solid compound comprising a hydroxychloride of a bivalent metal. The latter is preferably magnesium hydroxychloride and has the formula: Mg(OH)Cl.

Though this is not yet established, it is believed that the reaction between the transition metal compound and the hydroxychloride of a bivalent metal which produces the catalysts according to the above U.S. patent, is the result of a chemical bonding through the OH groups of the hydroxychloride.

The catalytic complex formed comprises the following elements:

a bivalent metal M, preferably magnesium chlorine
a transition metal M' bonded to the bivalent metal through oxygen
reactive groups X bonded to the transition metal.

A process has also described, in French Pat. No. 1,516,800 dated Dec. 21, 1966 which corresponds to U.S. patent application Ser. No. 676,738 filed on Oct. 20, 1967 by Berger et al., now abandoned in favor of Ser. No. 118,998, filed Feb. 25, 1971 and which is incorporated herein by reference, for the polymerization and the copolymerization of olefins in the presence of a catalyst comprising an organometallic compound and a solid material having at the surface thereof, catalytic complexes comprising a bivalent metal, a halogen, oxygen and a transition metal having halogenated substituents. This solid material has been obtained by reacting in the absence of diluent, a liquid halogenated derivative of a transition metal with a solid support comprising an oxygenated compound of a bivalent metal, the latter being anhydrous and having very few hydroxyl groups.

As disclosed in the French patent, all of the oxygenated compounds of divalent metals produce catalytic complexes having useful properties; however, commercial oxygenated compounds such as simple or complex oxides, sulfates, nitrates, phosphates and silicates are usually preferred. Oxygenated compounds of divalent metals derived from mono- or polycarboxylic organic acids are also used for the preparation of very active polymerization catalysts. Among the preferred carboxylic acid salts are the polymers and copolymers containing units derived from acrylates, methacrylates, maleates, fumarates and itaconates, and the polyadipate, the polysebacate and various polyphthalates of magnesium or calcium.

It has indeed been observed that the chemical reactions between a halogenated derivative of a transition metal and an oxygenated compound of a bivalent metal produce catalytic complexes having properties similar to those of catalytic complexes obtained from a hydroxychloride of the same metal.

The mechanism and the stoichiometry of these reactions is not known for sure. It has been observed, however, that the bonding of the transition metal on the oxygenated compound resulting from these reactions is always accompanied by the supplementary bonding of a certain quantity of halogen which is not directly bonded to the transition metal.

SUMMARY OF THE INVENTION

It has now been found that the activity of the polymerization catalyst disclosed in U.S. patent application Ser. No. 676,738, cited above may be substantially increased and other interesting properties may be developed by halogenating the catalyst supports.

The invention concerns catalysts for the polymerization of olefins comprising an organometallic compound and a solid support which is obtained by reacting a halogenating agent and a derivative of a transition metal with a solid support, the latter comprising an oxygenated compound of a bivalent metal which is anhydrous and has substantially no hydroxyl groups.

BRIEF DESCRIPTION OF THE PREFERRED EMBODIMENTS

The halogenating agent is selected from compounds which are liquid or gaseous under the reaction conditions and which can react with the initial oxygenated compound so that the halogen atoms become bonded to the latter, particularly at the surface thereof.

Halogenating agents which are particularly suitable include hydrogen chloride, hydrogen bromide, hydrogen iodide, hydrogen fluoride, phosphorus trichloride, phosphorus oxychloride, thionyl chloride, sulfuryl chloride, phosgene, nitrosyl chloride and the halides of organic or mineral acids in general. The halogens themselves, i.e. $Cl_2$, $Br_2$ etc. may also be used successfully.

The solid compound which is used as support in the above treatment is an oxygenated compound of a bivalent metal. It is preferably selected from the compounds of magnesium, calcium, zinc, manganese, iron, nickel, cobalt and tin. Even though all the oxygenated compounds of the above metals produce catalytic complexes which possess interesting properties, it is preferable in most cases to use commercial oxygenated compounds such as simple and complex oxides, sulphates, nitrates, phosphates, silicates and the salts derived from mono- or polycarboxylic acids.

Preferably however, the oxides of the general formula MO, are used such as MgO, CaO, ZnO, MnO, NiO, FeO, CoO and SnO. Furthermore, when the basic bivalent metal is polyvalent, one may also use as starting compound one of the oxides thereof in which the valency is higher than 2. In this respect, the oxides of the formula $Fe_2O_3$ and $Co_2O_3$ are suitable.

To the degree possible, the above compounds are anhydrous and free from hydroxyl groups. Water and a high hydroxyl group content are not desirable in the present process for preparing a polymerization catalyst, since these components are harmful to the properties of the catalyst. Therefore, the oxygenated compounds which are used as reactive supports must be anhydrous as far as possible and the reaction should be carried out in the absence of too many hydroxyl groups. Support materials containing less than 0.1 and preferably 0.05 hydrozyl group per molecule are particularly suitable for the preparation of the catalytic complexes. However, when the initial supports comprise heated oxides which still possess a certain number of superficial hydroxyl groups, it is not essential to eliminate these groups and as with the other supports, it is sufficient to dry them for an extended period of time under vacuum or at a high temperature.

The granulometry of the support is not critical and has no influence whatsoever on the chemical processes involved during the bonding reaction. Preferably, however, supports having a sufficiently coarse granulometry are used, for example, those in which the particles have an average diameter of the order of 0.1 mm.

The reaction between the solid support and the halogenating agent may be carried out at the same time or even before the reaction for bonding the transition metal derivative on the support. If the halogenation is carried out before the bonding reaction, the support may be suspended in the liquid halogenating agent which is heated to the desired temperature, if the latter is liquid at said temperature, or the support may be contacted with a stream of gas comprising the halogenating agent which is pure or diluted with an inert gas. In the latter case, halogenation is advantageously carried out in a fluid bed. The reaction is always performed in the absence of humidity, at a temperature between 20 and 250° C., preferably between 60 and 150° C.

By proceeding in this manner, there are obtained new activated catalyst supports which are capable of bonding a transition metal derivative to produce catalysts which are particularly active and possess a plurality of favorable properties which will be given in more detail hereinafter.

These new activated supports contain the following components:

The basic bivalent metallic element M of the initial oxygenated compound
oxygen
possibly the remaining anionic groups originating from the initial oxygenated compound, if the latter is a salt
a halogen X
hydrogen when the halogenating agent is hydrogen halide
and are characterized by the fact that the atomic ratio X/M is less than 1, but greater than 0, i.e. at least about 0.01

Thus when supports of the formula MO are halogenated with the halogenating agent HX, the resultant supports have the formula MO·xHX wherein $x$ is less than 1 and greater than 0, or at least about 0.01.

For example, when the initial compound is magnesium oxide MgO and the halogenating agent is hydrogen chloride HCl, there are obtained supports corresponding to the formula MgO·xHCl, in which $x$ is between 0 and 1. These new supports are used to produce catalysts having remarkable polymerization activities, which are higher than when the catalysts are obtained directly from MgO.

If the halogenation is carried out simultaneously as the reaction for bonding the transition metal derivative, the above described phenomena are produced in the reaction medium and the new support is formed in situ to immediately bond the transition metal derivative.

When the halogenation is carried out at the same time as the reaction for bonding the transition metal derivative on the support, in general it is performed under conditions which are specific for this reaction, preferably in the absence of solvent, by simply suspending the support in the transition metal derivative which is kept liquid. If the halogenation or dehydrohalogenation agent is a liquid, it is added directly to the transition metal derivative, and it is bubbled therethrough if it is gaseous.

The transition metal derivatives to be used for the preparation of the new polymerization catalysts may be selected from the derivatives of the metals of Groups IVb, Vb and VIb of the Periodic Table and include the halides, oxyhalides, haloalkoxides, oxyalkoxides, and alkoxides of these metals. Preferably, those derivatives which are liquid under the reaction conditions are used, such as $TiCl_4$, $TiCl_2(OC_2H_5)_2$, $Ti(OC_4H_9)_4$, $VCl_4$, $VOCl_3$, $VO(OC_4H_9)_3$ and $CrO_2Cl_2$.

The reaction between the transition metal derivative and the solid support is preferably carried out in the absence of solvent, by merely suspending the support, as such or after the above halogenation treatment, in the transition metal derivative which is kept liquid and is heated to a suitable temperature, generally between 40 and 180° C. Then the solid catalyst may be extracted by means of the halogenated derivative which is heated to a temperature between 80 and 180° C.

The solid catalyst is then treated to eliminate the transition metal compounds which have not been chemically bonded to the support. This treatment is preferably carried out by washing with hexane or with any other volatile inert solvent.

In order to obtain a catalytic complex adapted to produce catalysts having desired properties, it is required that, after bonding of the transition metal and elimination of the derivatives which are not chemically bonded, the atomic ratio halogen/transition metal be higher than 3 and in most cases, preferably higher than 10. This is the purpose of the halogenation treatment according to the invention.

The method for the preparation of the catalytic complexes in two stages, i.e. halogenation then bonding of the transition metal derivative has contributed to the determination of the mechanism of the process which leads to the preparation of the catalytic complexes having the desired properties. By analyzing the products formed after each stage, it has been shown that during the first stage, halogen is bonded on the support in such a quantity that the $X/M$ ratio is lower than 1; while during the second stage, even though the halogen content keeps increasing in most cases, the atomic ratio supplementary halogen/ bonded transition metal is approximately equal to 4, if the bonding is carried out with a tetravalent halide of a transition metal.

The desirability and advantage of the halogenation treatment according to the invention are emphasized by the fact that if there is an elimination of the hydrogen halide which is formed during the reaction between a solid carrying superficial hydroxyl group and a halide of a transition metal to avoid the above halogenation treatment, there are obtained catalytic complexes in which the atomic ratio halogen/transition metal is equal and often lower than the valency of the transition metal minus 1 (i.e. 3 in the case of titanium); such catalytic complexes produce catalysts which are much less active than those of the present invention.

The solid catalyst obtained are activated by contact with an organometallic compound selected from the organic derivatives of the metals of Groups I, II, III and IV of the Periodic Table. As used herein, the term organometallic compounds includes organosilicon compounds in accordance with the usage in Organometallic Chemistry— Selected Topics in Modern Chemistry by E. G. Rochow, Reinhold Publishing Corp., 1964 and The Chemistry of Organometallic Compounds, by E. G. Rochow, D. T. Hurd and R. N. Lewis, John Wiley and Sons, 1957. Organometallic halides and hydrides and completely alkylated derivatives thereof, such as dialkylaluminum halides, alkylmagnesium halides, alkylaluminum hydrides, alkyltin hydrides, and organic compounds of silicon having at least one Si-H bond may be used as activators, wherein trialkyl aluminum compounds are preferred. As examples of such activators triethylaluminum, triisobutylaluminum, tri-n-octylaluminum, diethylaluminum chloride, ethylmagnesium bromide, diisobutylaluminum hydride, tri-n-butyltin hydride, triethylsilane, methyl hydrogen silicone oil may be mentioned among the activating compounds which can be used according to the present invention. Trialkyl aluminum derivatives are however preferred.

The quantity of activator is not critical as long as there is a molar excess thereof with respect to the transition metal bonded to the support. The molar ratio activator/bonded transition metal, is preferably between 10 and 50.

The activation may be carried out immediately before introducing the monomer; it is also possible to allow the catalyst to age for a more or less extended period of time, at room temperature or higher.

By means of the process according to the present invention, it is possible to obtain catalysts which are very active and at the same time, have a low chlorine content, which assures the stability of polyolefins prepared with these catalysts. It has indeed been found that the quantity of the chlorine present in the polymer can give rise to dissociation and production of hydrogen chloride; and it has been found that the quantity thereof in the present catalyst is sufficiently low that all risks of corrosion or degradation of the polymer by means of the hydrogen halide is avoided.

Other catalysts prepared by the process according to the invention and having a higher chlorine content, are characterized by still improved activities or by other desirable properties such as sensitivity to the chain transfer action of hydrogen.

The catalysts prepared by the process according to the invention may be used for the polymerization and the copolymerization of $\alpha$-olefins and particularly for the preparation of polyethylene, polypropylene and copolymers of ethylene and propylene.

Beside having common properties with a certain number of catalysts chemically bonded to supports, the catalysts according to the present invention possess some unexpected and highly advantageous characteristics.

They are particularly sensitive to the chain transfer action of hydrogen and may be used to produce low, and even very low molecular polyethylenes, without requiring the use of very high partial pressures of hydrogen.

On the other hand, these catalysts are much less sensitive than most of the known catalysts to the action of the poisoning agents of the polymerization catalysts, particularly water and oxygen.

Finally, because of their high stability, their very low content of compounds of transition elements and their extremely high activities, these new catalysts are found in very low quantity and as inert and harmless residues in the product obtained at the outlet of the polymerization reactor. As a consequence, the latter product may be used as such without purification. The production of the new catalysts according to the present invention permits a very important simplification of the polymerization apparatuses and a corresponding reduction of the cost of the product.

The following examples except for Examples 1R, 14R and 17R further illustrate the best mode currently contemplated for carrying out the present invention but must not be construed as limiting the scope thereof in any manner; examples which include the letter "R," are reference examples which have been included for purposes of comparison and do not illustrate the present invention.

EXAMPLES 1R, AND 2 TO 9

(a) Preparation of the support

Pure basic magnesium carbonate of the formula $4MgCO_3.Mg(OH)_2.H_2O$ used in analysis is converted into magnesium oxide by heating at 540° C. while flushing with oxygen for 16 hours.

The magnesium oxide obtained is submitted to various halogenation treatments as indicated in Table 1. This table also gives analyses of the catalyst supports obtained.

TABLE 1

| Example No. | Nature of halogenating agent | Temperature of treatment, °C. | Length of treatment, min. | Analysis of activated support | | |
|---|---|---|---|---|---|---|
| | | | | Halogen X, g./kg. | Magnesium, g./kg. | Ratio, X/Mg |
| 1[1] | | | | | | |
| 2 | HCl | 50 | 120 | 401 | 352 | 0.78 |
| 3 | HCl | 130 | 120 | 435 | 325 | 0.91 |
| 4 | Mixture HCl/N₂, 1:1 | 50 | 120 | 354 | 357 | 0.68 |
| 5 | Mixture HCl/N₂, 1:4 | 130 | 120 | 22 | 561 | 0.027 |
| 6 | Mixture HCl/N₂, 1:1 | 200 | 120 | 408 | 369 | 0.76 |
| 7 | Cl₂ | 80 | 120 | 28 | 548 | 0.035 |
| 8 | HBr | 130 | 120 | 505 | 279 | 0.55 |
| 9 | HI | 130 | 60 | 533 | 268 | 0.38 |

[1] Reference.

The treatments were performed by flushing with the gaseous halogenating agent during the time indicated, the solid heated to the indicated temperature.

(b) Bonding reaction

The various supports obtained as indicated above and the reference support (Example 1R) which was not previously treated, were reacted with pure $TiCl_4$.

The reaction is carried out in a glass reactor having a sintered glass plate at the lower portion thereof and provided with a refrigerating device at the upper portion, into which there are introduced 50 ml. of $TiCl_4$ and 10 to 15 g. of a support. The reactor is heated at 130° C. during 1 hour after which $TiCl_4$ is separated by filtration through the fritted glass plate and washed 20 times with hexane. The catalytic complex obtained is dried under vacuum and analyzed. The results of the analyses are given in Table 2.

(c) Polymerization

The given quantity of solid catalyst prepared as above is suspended in 500 ml. of hexane in a 1.5 liter stainless steel reactor. Two ml. of a solution containing 100 g./liter of triisobutylaluminum in hexane are then introduced in the above suspension.

The temperature of the autoclave is raised to 80° C. and there are introduced ethylene, under a pressure of 2 kg./cm.$^2$, and hydrogen, under a pressure of 4 kg./cm.$^2$. After a reaction period of 2 hours at a pressure maintained constant by a continuous addition of ethylene, the autoclave is cleared of all gases and polyethylene is removed and weighed after drying under vacuum.

The results of the polymerizations are given in the following Table 2.

TABLE 2

| Example No. | Analysis of solid catalyst | | | | | Quantity of | | Catalytic activity, g. PE/hr. g. Ti atm., $C_2H_4$ | Melt index of PE g./10 min |
|---|---|---|---|---|---|---|---|---|---|
| | Mg, g./kg. | I or Br, g./kg. | Cl, g./kg. | Ti, g./kg. | Halogen/Ti ratio | Solid catalyst, g. | PE obtained, g. | | |
| 1R | 423 | | 272 | 22 | 16.8 | 0.090 | 53 | 6,710 | 1.05 |
| 2 | 350 | | 416 | 3.9 | 145 | 0.364 | 44 | 7,800 | 3.4 |
| 3 | 331 | | 451 | 3.7 | 165 | 0.368 | 49 | 8,950 | 4.1 |
| 4 | 367 | | 386 | 4.4 | 119 | 0.330 | 64 | 11,000 | 2.45 |
| 5 | 446 | | 256 | 8.5 | 40.7 | 0.167 | 91 | 16,000 | 4.1 |
| 6 | 366 | | 408 | 0.6 | 885 | 2.445 | [1] 138 | 23,800 | 2.75 |
| 7 | 438 | | 260 | 10 | 36 | 0.136 | 55 | 10,100 | 3.2 |
| 8 | 295 | 387 | 90 | 7.2 | 49.2 | 0.214 | 51 | 8,300 | 1.6 |
| 9 | 244 | 411 | 45 | 1.3 | 130 | 1.073 | [2] 110 | 19,700 | 4.8 |

[1] For this polymerization, 4 ml. of a solution of $Al(iC_4H_9)_3$ were used.
[2] For this polymerization, the pressures of $H_2$ and $C_2H_4$ were respectively at 2 and 4 kg./cm.[2]

When comparing the reference polymerization, Example 1R to polymerization carried out with the supports treated according to the invention, it is realized that:

(1) There is a general increase of the catalytic activity;
(2) There is a general increase of the melt index and as a consequence, the processing of the resulting polyethylene is facilitated;
(3) As expected, the treatment generally increases the quantity of halogen bonded to the support. However, it is surprising that there is always a decrease of the quantity of bonded titanium, the latter being more active. It can be concluded that the treatment serves to bond only the more active titanium on the support, while bonding of the less active titanium is more or less prevented depending on the efficiency of the treatment.

EXAMPLES 10 TO 13

A magnesium oxide prepared from basic magnesium carbonate as indicated in Examples 1R to 9 is submitted to a halogenating treatment in the presence of thionyl chloride heated to reflux temperature. The length of the treatment is 3 hours.

A first fraction of the resulting product is treated with pure $TiCl_4$ as indicated in Examples 1R to 9; this fraction is used in polymerization reaction No. 10.

A second fraction is allowed to react with a 25% heptane solution of $TiCl_2(OC_2H_5)_2$ for half an hour at 100° C.; this fraction is used in polymerization reaction No. 11.

A third fraction (polymerization reaction No. 12) is reacted with a 25% heptane solution of $VOCl_3$ for half an hour at 100° C.

A fourth fraction (polymerization reaction No. 13) is impregnated with a 25% carbon tetrachloride solution of $CrO_2Cl_2$, said solution being heated at reflux temperature for 1 hour.

The analytical data concerning the catalytic supports obtained and the conditions under which the polymerization reactions were carried out according to the mode of operation of Examples 1R to 9 are given in Table 3.

TABLE 3

| | Example Number | | | |
|---|---|---|---|---|
| | 10 | 11 | 12 | 13 |
| Analysis of solid catalyst: | | | | |
| Mg, g./kg | 376 | 186 | 426 | 498 |
| Cl, g./kg | 332 | 278 | 240 | 148 |
| Ti, V or Cr, g./kg | 25 | 116 | 17 | 10.4 |
| Ratio Cl/Ti, V or Cr | 18 | 3.2 | 20 | 21 |
| Polymerization: | | | | |
| Quantity of catalytic complex, g | 0.139 | 0.619 | 1.057 | 1.135 |
| Quantity of activator (Al(iBu)$_3$), g | 0.200 | 1.000 | 1.000 | [1] 0.500 |
| Duration, hr | 2 | 1 | 2 | 2 |
| Partial pressure $C_2H_4$, kg./cm.[2] | 2 | 24 | 8 | 24 |
| Partial pressure $H_2$, kg./cm.[2] | 4 | | 16 | |
| Quantity of PE produced, g | 11 | 128 | 44 | 67 |
| Catalytic activity, g. PE/g. Ti, V or Cr, hr. atm. $C_2H_4$ | 790 | 74 | 152 | 118 |

[1] The activator was tri-n. propylaluminum.

EXAMPLES 14R, 15 AND 16

The support is a magnesium oxide prepared from basic magnesium carbonate by heating during 16 hours while flushing with dry air.

The product obtained is separated into 3 fractions and treated in the following manner.

Example 14R: the first fraction is impregnated with pure $TiCl_4$ as specified in Examples 1R to 9 and there is no halogenating treatment thereof.

Example 15: the second fraction is flushed with a flow of pure HCl at a temperature of 130° C. during 2 hours, and is thereafter impregnated with pure $TiCl_4$ as indicated above.

Example 16: the third fraction is treated with HCl while being impregnated with pure $TiCl_4$; the treatment is carried out at a temperature of 130° C. during 30 minutes.

The three above solid catalysts obtained are used to carry out polymerizations exactly under the conditions specified for Examples 1R to 9.

The analytical data concerning the solid catalysts and the results of the polymerizations are given in Table 4.

TABLE 4

| | Example | | |
|---|---|---|---|
| | 14R | 15 | 16 |
| Analysis of solid catalysts: | | | |
| Ti, g./kg | 25 | 3.8 | 14 |
| Cl, g./kg | 280 | 449 | 319 |
| Mg, g./kg | 421 | 332 | 430 |
| Cl/Ti ratio | 15 | 160 | 31 |
| Polymerization: | | | |
| Quantity of solid catalyst, g | 0.064 | 0.387 | 0.117 |
| Quantity of PE, g | 31 | 61 | 72 |
| Catalytic activity, g. PE/hr. g. Ti atm. $C_2H_4$ | 4,850 | 10,400 | 11,000 |
| Melt index of PE, g./10 min | 3.40 | 5.1 | 2.40 |

Upon comparison of the three polymerization reactions described in detail in the above Table 4, it is obvious that the increase of the catalytic activity is due to the halogenating treatment, whether the latter is carried out previously or simultaneously. In each case it will be seen that less titanium is bonded to the support but that said bonded titanium is more active.

EXAMPLES 17R, 18 AND 19

These examples repeat the same polymerization reactions as Examples 14R to 16, however the catalytic support comprises a microspheroidal magnesium silicate (catalyst support sold by Davison).

The analysis of the various solid catalysts and the results of the polymerizations are given in Table 5.

TABLE 5

| | Example | | |
|---|---|---|---|
| | 17R | 18 | 19 |
| Type of treatment | None | [1] | [2] |
| Analysis of solid catalysts: | | | |
| Ti, g./kg | 32 | 6.1 | 7 |
| Cl, g./kg | 121 | 37 | 28 |
| Mg, g./kg | 3.6 | 8 | 5.3 |
| Ratio Cl/Ti | 118 | 152 | 150 |
| Polymerization: | | | |
| Quantity of solid catalyst, g | 0.145 | 0.958 | 0.949 |
| Quantity of PE obtained, g | 16 | 29 | [3] 60 |
| Catalytic activity, g. PE/hr. g. Ti atm. $C_2H_4$ | 860 | 1,240 | 2,250 |
| Melt index of PE, g./10 min | 3.0 | 2.4 | 3.3 |

[1] Previous with HCl:hr. at 130° C.
[2] Simultaneous to the bonding of $TiCl_4$.
[3] Amount of triisobutylaluminum, 0.4 g. instead of 0.2 g.

Again it will be seen that the halogenating treatment has a favorable effect and that the results of the previous and simultaneous treatments are similar.

EXAMPLE 20

Under the conditions given in Example 16, a sample of pure magnesium sulphate used for analysis and previously dehydrated, is treated with $TiCl_4$ while bubbling HCl for 1 hour.

There is obtained a solid catalyst having the following composition:

Ti: 2.5 g./kg.
Cl: 5.8 g./kg.
Mg: 201 g./kg.

This solid catalyst in an amount of 0.618 g. is used to carry out the polymerization of ethylene under the same conditions as in Example 1R. There is obtained 144.5 g. of polyethylene having a melt index of 2.5. The catalytic activity is 23,450 g. of polyethylene per hour, grams of titanium and atmosphere of ethylene. Under similar conditions, a support which had not been treated had an activity of 12,260.

EXAMPLES 21 TO 23

Under the conditions given in Examples 10 to 13, various metal oxide samples which could produce hydroxy chloride of the formula M(OH)Cl were given a pretreatment with thionyl chloride for 3.5 hours. The samples where then reacted with $TiCl_4$.

The solid catalysts obtained for which the analytical results are given in Table 6 are used to carry out the polymerization of ethylene. The conditions and results are also given in Table 6. Also given in Table 6 are the results of reference polymerizations carried out with solids which have not been previously treated with $SOCl_2$.

TABLE 6

|  | Example | | |
| --- | --- | --- | --- |
|  | 21 | 22 | 23 |
| Nature of oxide | CaO | $Co_2O_3$ | NiO |
| Analysis of solid catalysts: | | | |
| Ti, g./kg | 0.2 | 2 | 0.06 |
| Cl, g./kg | 14 | 41 | 4.3 |
| Basic metal of oxide, g./kg | 667 | 728 | 771 |
| Ratio Cl/Ti | 93 | 28 | 97 |
| Polymerization: | | | |
| Quantity of solid catalyst, g | 10.310 | 1.121 | 6.217 |
| Quantity of triisobutylaluminum, g | 1.00 | 1.00 | 1.00 |
| Pressure of ethylene, kg./cm.² | 24 | 6.2 | 24 |
| Duration, minutes | 120 | 30 | 120 |
| Quantity of PE obtained, g | 150 | 114 | 24 |
| Catalytic activity ($SOCl_2$ treated support), g. PE/hr. g. Ti atm. $C_2H_4$ | 1,510 | 8,700 | 800 |
| Activity of reference examples,* g. PE/hr. g. Ti atm. $C_2H_4$ | 1,090 | 80 | 40 |

*As indicated above, reference examples are identical with Examples 21, 22 and 23, respectively, except that the catalyst has not been treated with $SOCl_2$.

What we claim and desire to secure by Letters Patent is:

1. In a catalyst for the polymerization and the copolymerization of olefins which is comprised of an organometallic compound in which the metal thereof is selected from Groups I, II, III and IV of the Periodic Table and a solid catalytic component composed of an oxygenated bivalent metal compound which is substantially anhydrous and is substantially free of hydroxyl groups and a transition metal compound selected from the group consisting of halides, oxyhalides, halo-alkoxides, oxyalkoxides and alkoxides of the metals of Groups IVb, Vb and VIb of the Periodic Table bonded to said bivalent metal compound, the improvement wherein said oxygenated bivalent metal compound is a halogenated oxygenated bivalent metal compound containing at least about 0.01 atom of halogen but less than 1 atom of halogen per atom of said bivalent metal, said solid catalytic component containing more than 3 atoms of halogen per atom of said transition metal.

2. Catalyst according to claim 1, in which the bivalent metal is selected from the group consisting of magnesium, calcium, zinc, manganese, iron, nickel, cobalt and tin.

3. Catalyst according to claim 1 in which said oxygenated bivalent metal compound is halogenated with a halogenating agent selected from the group consisting of hydrogen halides, halides of organic and inorganic acids and halogens.

4. Catalyst according to claim 1, in which the organometallic compound is selected from the group consisting of the organic derivative of the metals of Groups I, II, III and IV of the Periodic Table.

5. Catalyst according to claim 1 in which the atomic ratio of said halogen to said transition metal bonded to said catalytic component is greater than 10.

6. Catalyst according to claim 1 in which said oxygenated bivalent metal compound is an oxide, sulphate, nitrate, phosphate, silicate or salt of a mono- or polycarboxylic acid.

7. Catalyst according to claim 1 in which said bivalent metal compound is an oxygen containing magnesium compound.

8. Catalyst according to claim 1 in which said solid support is selected from a member of the group consisting of a bivalent metal oxide and a bivalent metal salt of an oxygen-containing inorganic acid.

9. In a process for the preparation of a catalytic complex for the polymerization and the copolymerization of olefins which comprises preparing said catalytic complex by reacting a derivative of a transition metal selected from a member of the group consisting of halides, oxyhalides, haloalkoxides, oxyalkoxides and alkoxides of the metals of Groups IVb, Vb and VIb of the Periodic Table with a solid support comprising an oxygenated compound of a bivalent metal which is anhydrous and is substantially free of hydroxyl groups the improvement which comprises reacting a halogenating agent with said support at a temperature of 20 to 250° C. in the absence of humidity, said reaction with said halogenating agent being carried out no later than the reaction of said transition metal with said solid support, whereby as a result of said reaction with said halogenating agent said support contains bonded thereto, halogen in an atomic ratio of greater than 0 but less than 1 based on said bivalent metal and after reaction with said transition metal compound said catalytic complex contains halogen in an atomic ratio of greater than 3 based on said transition metal compound.

10. Process according to claim 9 in which said halogenating agent is reacted with said support prior to reaction of said support with said derivative of said transition metal.

11. Process according to claim 9 in which said halogenating agent is reacted with said solid support simultaneously with said reaction of said derivative of said transition metal and said solid support.

12. Process according to claim 9, in which the halogenating reaction and the bonding reaction of the transition metal derivative are carried out simultaneously in a reaction medium comprising a pure liquid derivative of a transition metal in which said support is suspended.

13. Process according to claim 9 in which the solid support first undergoes a halogenating treatment by contact with a halogenating agent at a temperature between 20 and 250° C. in the absence of humidity, to give an activated solid support, which is then treated with the transition metal compound.

14. Process according to claim 9 in which the temperature during said halogenation reaction is between 60 and 150° C.

15. Process according to claim 9 in which said halogenating agent is selected from a member of the group consisting of hydrogen halides, halides of organic and inorganic acids and halogens.

16. Process according to claim 9 in which said solid support is selected from a member of the group consisting of a bivalent metal oxide and a bivalent metal salt of an oxygen-containing inorganic acid.

References Cited

UNITED STATES PATENTS

| | | | |
|---|---|---|---|
| 1,232,169 | 7/1917 | Ashcroft | 23—87 R |
| 2,374,453 | 4/1945 | Oliver et al. | 23—87 R |
| 2,868,621 | 1/1959 | Giraitis | 23—87 R |
| 2,970,887 | 2/1961 | Hill | 23—87 R |
| 3,121,696 | 2/1964 | Hockstra | 252—441 |
| 3,400,110 | 9/1968 | Dassesse et al. | 252—429 CX |
| 3,454,547 | 7/1969 | Delbouille et al. | 252—429 CX |
| 3,526,616 | 9/1970 | Delbouille et al. | 252—429 CX |

PATRICK P. GARVIN, Primary Examiner

U.S. Cl. X.R.

252—431, 431 C, 441; 260—88.2, 94.9